United States Patent [19]

Jenkines

[11] Patent Number: 5,104,693
[45] Date of Patent: Apr. 14, 1992

[54] POLYURETHANE CARPET-BACKING PROCESS BASED ON SOFT SEGMENT PREPOLYMERS OF DIPHENYLMETHANE DIISOCYANATE (MDI)

[75] Inventor: Randall C. Jenkines, Dalton, Ga.

[73] Assignee: The Dow Chemical Company, Midland, Mich.

[21] Appl. No.: 630,597

[22] Filed: Dec. 20, 1990

[51] Int. Cl.$^5$ .............................. B05D 5/00
[52] U.S. Cl. ..................... 427/244; 427/389.9; 427/358; 427/373; 428/95
[58] Field of Search ........... 427/244, 389.9, 358, 427/434.4, 428, 373; 252/182.24; 428/95

[56] References Cited

U.S. PATENT DOCUMENTS

| | | | |
|---|---|---|---|
| 4,035,529 | 7/1977 | Meisert et al. | 427/244 |
| 4,181,770 | 1/1980 | Schuhmacher et al. | 427/244 |
| 4,241,131 | 12/1980 | Bailey | 428/262 |
| 4,296,159 | 10/1981 | Jenkines | 428/95 |
| 4,483,894 | 11/1984 | Porter et al. | 427/244 |
| 4,515,646 | 5/1985 | Walker et al. | 427/244 |
| 4,696,849 | 9/1987 | Mobley et al. | 428/95 |
| 4,775,558 | 10/1988 | Haas et al. | 427/373 |
| 4,845,133 | 7/1989 | Priester, Jr. et al. | 252/182.24 |
| 4,853,054 | 8/1989 | Turner et al. | 156/78 |
| 4,913,958 | 4/1990 | Skaggs et al. | 427/244 |

*Primary Examiner*—Michael Lusignan
*Assistant Examiner*—Diana L. Dudash

[57] ABSTRACT

Polyurethane-backed substrates such as attached cushion carpeting are prepared from a polyurethane forming composition based on a soft segment prepolymer of MDI or an MDI derivative. The use of the prepolymer provides a backing having good strength properties and good resiliency.

7 Claims, No Drawings

POLYURETHANE CARPET-BACKING PROCESS BASED ON SOFT SEGMENT PREPOLYMERS OF DIPHENYLMETHANE DIISOCYANATE (MDI)

BACKGROUND OF THE INVENTION

This invention relates to polyurethane-backed substrates, and to a process and composition for making same.

Carpets and other substrates having attached polyurethane foam layers are well-known and described, for example, in U.S. Pat. Nos. 3,755,212, 3,821,130, 3,862,879, 4,022,941, 4,171,395, 4,278,482, 4,286,003, 4,405,393, 4,483,894, 4,512,831, 4,515,646, 4,595,436, 4,611,044, 4,657,790, 4,696,849, 4,853,054, and 4,853,280. In commercial practice, these polyurethane-backed materials have been prepared from polyurethane-forming compositions based on toluene diisocyanate (TDI). However, for handling reasons, it is desired to substitute a diphenylmethane diisocyanate-based material for the TDI in this application.

TDI-based frothed polyurethanes have an excellent balance of physical properties, including good tensile strength, load bearing, tear strength and resiliency. Previous attempts to duplicate these properties with MDI-based systems failed to achieve this excellent balance. Generally, the MDI systems yield inferior resiliency when formulated to provide load-bearing, tensile, tear and elongation properties equivalent to those provided by TDI-based systems. Resiliency can be improved in these systems, typically by reduction of hard segment levels (decreased use of chain extender), but with this reduction comes a loss of tensile, tear, load-bearing and elongation.

SUMMARY OF THE INVENTION

In one aspect, this invention is an improvement in a process for preparing a polyurethane-backed substrate wherein an uncured polyurethane-forming composition is applied to a surface of the substrate, gauged and cured to form an adherent backing thereto, the improvement comprising employing a polyurethane-forming composition containing (A) an isocyanate-reactive material or mixture thereof having an average equivalent weight of about 1000 to about 5000, (B) an effective amount of a blowing agent, and (C) a polyisocyanate in an amount to provide an isocyanate index of about 90 to about 130, wherein at least 30% by weight of such polyisocyanate is an MDI soft segment prepolymer having an NCO content of about 10 to about 30% by weight.

This invention permits the use of an MDI-based isocyanate while providing for a combination of physical properties, including tensile strength, tear strength, load-bearing, elongation and resiliency, which is comparable to that previously achieved only with a TDI-based isocyanate.

DETAILED DESCRIPTION OF THE INVENTION

The application of an uncured polyurethane-forming composition to a substrate and curing to form a layer of polyurethane adherent to the substrate is well-known and described, for example, in U.S. Pat. Nos. 3,755,212, 3,821,130, 3,862,879, 4,022,941, 4,171,395, 4,278,482, 4,286,003, 4,405,393, 4,483,894, 4,512,831, 4,515,646, 4,595,436, 4,611,044, 4,657,790, 4,696,849, 4,853,054, and 4,853,280, all incorporated herein by reference.

In the process, a polyurethane-forming formulation as described hereinafter is prepared, and then applied to at least one surface of a suitable substrate before it cures to a tack-free state. In one alternative embodiment, the composition is applied to the substrate before any significant curing occurs, using equipment such as a doctor knife, air knife or extruder to apply and gauge the layer. Alternatively, the composition may be formed into a layer on a moving belt or other suitable apparatus and partially cured, then married to the substrate using equipment such as a double belt (double band) laminator or a moving belt with an applied foam cushion. After application and gauging, the layer is cured, advantageously through the application of heat, such as by heating plates, a convection oven, an infrared oven, or other suitable apparatus. A cure temperature of about 100° C. to about 170° C. for a period of about 1 to about 120 minutes is suitable. Of course, the cure time is dependent on the temperature.

It is preferred to handle the substrate, at all times prior to final cure of the polyurethane-forming composition, such that mechanically induced stress is minimized. It is also preferred to cool the coated substrate to a temperature of less than about 40° C. before rolling it up for storage or transportation, or cutting it into smaller segments.

In some applications, it is desirable to coat both sides of the substrate with polyurethane, as in preparing carpet underlayment. This is easily done by coating one surface of the substrate, turning it over and then coating the opposite surface. Multiple layers of polyurethane can, of course, be applied to the substrate if desired. In addition, multiple layers of substrate can be used. For example, a second substrate can be laid atop the curing polyurethane layer, so that when the polyurethane has cured, a sandwich structure having an intermediate polyurethane layer is obtained. Of particular interest are carpet sandwich structures having a topmost carpet face, an intermediate polyurethane foam layer, and a bottommost release layer of a nonwoven scrim, as described in U.S. Pat. No. 4,853,280, incorporated herein by reference.

The polyurethane-forming composition of this invention includes at least one isocyanate-reactive material having an equivalent weight of about 1000 to about 5000, an effective amount of a blowing agent, and a polyisocyanate in an amount to provide an isocyanate index of about 90 to about 130, wherein at least 30% by weight of such polyisocyanate is an MDI soft segment prepolymer having an NCO content of about 10 to about 30% by weight, said prepolymer being used in an amount to provide an isocyanate index of about 90 to about 130. It may further contain various optional components, some of which are preferably included, as discussed below.

The isocyanate reactive material (component (A)) is an organic material or mixture thereof having an average "functionality" of about 1.8 to about 4 isocyanate-reactive groups per molecule and an equivalent weight per isocyanate-reactive group of about 1000 to about 5000. The equivalent weight is preferably about 1000 to about 3000, more preferably about 1300 to about 2500.

The component (A) material or mixture thereof preferably has an average functionality of about 1.4 to about 3, more preferably about 1.8 to about 2.2, most preferably about 1.9 to about 2.1. The references to functionality herein refer to the actual, as opposed to nominal, functionality of the material. In the case of polyethers, especially the preferred polymers of propylene oxide, the actual functionality is usually lower than the nominal functionality, which is equal to the average number of active hydrogens/molecule of initiator compound used in its preparation. This is due to the formation of monofunctional impurities during the polymerization. The actual functionality of a polyether can be calculated from the amount of terminal unsaturation in known manner.

The isocyanate-reactive groups include hydroxyl, primary or secondary amine, thiol, carboxylic acid, imine, or other groups with an isocyanate-reactive hydrogen atom. Of these, the secondary amine, hydroxyl and imine groups are preferred due to their reactivity, and the hydroxyl groups are most preferred on the basis of cost and optimum reactivity.

The component (A) material can be of a various composition, but preferred are polyethers and polyesters, with polyethers being especially preferred. Among the polyethers, the polymers of cyclic ethers such as $C_2$–$C_6$ alkylene oxides and tetrahydrofuran are preferred, with polymers of propylene oxide and copolymers thereof with a minor amount of ethylene oxide being more preferred. Most preferred are polymers of propylene oxide having an internal or terminal block of poly(oxyethylene) units constituting about 15 to about 30 weight percent of the polymer, especially those having an equivalent weight from about 1900 to about 2500. The preparation of such polyethers by the polymerization of the cyclic ethers in the presence of a polyhydric initiator is well-known, and described, for example, in U.S. Pat. Nos. 2,902,478, 3,040,076, 3,317,508, 3,341,597 and 3,445,525, all incorporated herein by reference.

A blowing agent is also used in the process. In this invention, the term "blowing agent" is used rather broadly to include any gas which may be incorporated into the reaction mixture, as well as other materials which volatilize, decompose, react or otherwise generate a gas under the conditions encountered in the formation of the polyurethane layer. Frothing is the preferred method of reducing density of the polyurethane, and according the preferred blowing agent is air, nitrogen, argon, helium or some other gas which is inert to the reaction mixture. Air and nitrogen are most preferred gases. Alternatively, or in conjunction with the gas, water, low-boiling organic compounds including halogenated and non-halogenated types, the so-called "azo" blowing agents and the like can be used.

The blowing agent is used in an amount sufficient to provide the desired density to the polyurethane. In general, the polyurethane will have a density from about 1 to about 50, preferably about 2 to about 35, more preferably about 5 to about 25 pounds per cubic foot when frothed with a gas. If another blowing agent is used, the density is advantageously about 3 to about 30, preferably about 3 to about 21 pounds per cubic foot.

The polyisocyanate used in this invention comprises a soft segment prepolymer of MDI, having an NCO content of about 10 to about 30 weight percent. This prepolymer may be used neat. However, the neat prepolymer is often a solid. Thus, it is preferred to use it at a temperature above its melting point, or as a blend with at least one other polyisocyanate, provided that it constitutes at least 30 weight percent of the polyisocyanate blend.

By "soft segment prepolymer of MDI", it is meant the reaction product of a stoichiometric excess of diphenylmethane diisocyanate (MDI) or derivative thereof and a material which has at least two isocyanate-reactive groups and a Tg below about 0° C. By derivatives of MDI, it is meant three-ring or higher products derived by the phosgenation of anilineformaldehyde condensation products (commonly known as polymeric MDI), carbodiimide-modified MDI products, commonly known as "liquid MDI", MDI which is modified with allophonate or biuret linkages, and the like, which preferably have NCO contents of at least about 30% by weight. Pure MDI, mixtures of pure and polymeric MDI having an average functionality of no greater than about 2.2 isocyanate groups per molecule, and the liquid MDI products are preferred on the basis of cost, availability and performance.

The isocyanate-reactive material used in preparing the prepolymer is advantageously an organic polymer having an equivalent weight from about 500 to about 5000, preferably about 1000 to about 3000. Those materials previously described with regard to component (A) are suitable and preferred. Most preferred are hydroxyl-terminated polymers of propylene oxide or block or random copolymers of a major portion of propylene oxide and a minor portion of ethylene oxide. The isocyanate-reactive materials used in preparing the prepolymer advantageously has an average functionality from about 1.4 to about 3.0, preferably about 1.8 to about 2.8 and more preferably about 1.9 to about 2.2.

The prepolymer is prepared by reacting the MDI or derivative thereof and the isocyanate-reactive material at the desired proportions, typically at an elevated temperature. The proportions of components are selected so that the prepolymer has an NCO content of about 10 to about 30 weight percent, preferably about 15 to about 27 weight percent. A catalyst as described hereinafter for the reaction of isocyanates and isocyanate-reactive materials may be used. The reaction is preferably conducted in the substantial absence of moisture. Suitable conditions for the preparation of MDI prepolymers are described, for example, in U.S. Pat. No. 4,478,960, incorporated herein by reference.

It is most preferred that the MDI or derivative thereof and the isocyanate-reactive material used in preparing the prepolymer are chosen together so that the prepolymer has an average functionality of about 1.9 to about 2.5, preferably about 1.9 to about 2.4, more preferably about 1.95 to about 2.3 isocyanate groups per molecule.

In addition to the foregoing components, other optional but desirable materials may be employed. These include chain extenders, crosslinkers, fillers, surfactants, catalysts, colorants, antistatic agents, reinforcing fibers, antioxidants, preservatives, water scavengers, and the like. Among these, the use of chain extenders, fillers, surfactants and catalysts are preferred.

Chain extenders which are useful in this invention include compounds having an equivalent weight of up to about 500, preferably from about 31 to about 200, more preferably about 50 to about 150, and about 2 isocyanate-reactive groups per molecule. The isocyanate-reactive groups may be hydroxyl, mercaptan, primary or secondary amine, imine or the like, with those containing hydroxyl groups or stearically hindered or blocked amine groups being preferred. Most preferred are hydroxyl-terminated chain extenders. Among these are the $\alpha,\omega$-alkylene glycols and glycol ethers such as ethylene glycol, 1,4-butanediol, 1,6-hexamethylene glycol, dipropylene glycol, tripropylene glycol, diethylene glycol, triethylene glycol and the like; cyclohexanedimethanol, the diverse bisphenols and the like. Suitable amine chain extenders include methylene bis(o-chloroaniline), NaCl-blocked methylene dianiline, diethyltoluenediamine and the like.

In making backings for substrates such as textiles, a minor amount of chain extender is advantageously used. Preferably about 5 to about 50, more preferably about 5 to about 25 parts of chain extender are used per 100 parts by weight of component (A).

Suitable catalysts include organometallic compounds and tertiary amine compounds. Suitable organometallic compounds include compounds of tin, lead, iron, bismuth, mercury and the like. Preferred organotin catalysts include stannic carboxylates such as tin octoate and tin oleate, and stannous compounds such as dimethyltindilaurate, dibutyltindilaurate, diethyltindiacetate, di(2-ethylehexyl)tin oxide, dialkytinbis(alkylmercaptoesters) such as di(n-butyl)tinbis(isooctylmercaptoacetate), di(isooctyl)tin bis(isooctylmercaptoacetate) and the like. Preferred tertiary amine catalysts include trialkyl amines and heterocyclic amines, such as alkylmorpholines, 1,4-dimethylpiperazine, triethylene diamine, bis(N,N-dimethylaminoethyl)ether and N,N,N',N'-tetramethyl-1,3-butanediamine. The use of a delayed action catalyst such as an iron pentanedione or a bismuth carboxylate is often preferred, as described in U.S. Pat. No. 4,611,044, incorporated herein by reference.

Organometallic catalysts are advantageously used in amounts ranging from about 0.001 to about 0.1, preferably about 0.005 to about 0.05 parts per 100 parts of component (A). Tertiary amine catalysts are advantageously used in amount ranging from about 0.01 to about 5, preferably about 0.1 to about 2 parts per 100 parts of component (A).

The use of a surfactant is preferred, and among the surfactants, block copolymers of ethylene oxide or mixtures of a major amount of ethylene oxide and a minor amount of propylene oxide and dimethylsiloxane are preferred. The more preferred surfactants are block copolymers containing 15 to about 40 weight percent polydimethylsiloxane, a polyether block containing at least about 60 weight percent oxyethylene units, and a molecular weight below 30,000, as described in U.S. Pat. No. 4,483,894. A sufficient amount of the surfactant is used to stabilize the cells of the foaming reaction mixture until curing occurs, and to produce an even-celled foam. In general, such surfactants are used in amounts ranging from 0.01 to about 2 parts per 100 parts by weight of component (A).

It is usually desirable to include a filler in the reaction mixture, in order to reduce cost and improve some physical properties. Useful fillers include materials such as calcium carbonate, aluminum trihydrate, titanium dioxide, iron oxide, barium sulfate and the like. In frothed systems, the fillers are advantageously used in amounts ranging from about 5 to about 300, preferably about 20 to about 200, more preferably about 50 to about 130 parts per 100 parts component (A). Slightly higher loadings can be used in blown systems.

In preparing polyurethane-backed substrates according to the invention, the individual components of the polyurethane-forming composition are mixed and applied as a layer of preferably uniform thickness onto one surface of the substrate. It is often preferred to pre-mix all components except the polyisocyanate (and blowing agent, when the system is frothed) to form a formulated "B-side". This simplifies the metering and mixing of components at the time the polyurethane-forming composition is prepared. In preparing a frothed polyurethane backing, it is preferred to mix all components and then blend a gas into the mixture, using equipment such as an Oakes or Firestone foamer.

The substrate can be a wide variety of materials to which the polyurethane layer can adhere upon curing. Plastic sheeting, cloth, paper, metal foils, felts, fiberglass scrims, woven and non-woven textiles are all suitable. Preferred are carpets, especially non-woven carpets.

The amount of the polyurethane-forming composition used can vary widely, from about 5 to about 500 or more ounces per square yard, depending on the desired characteristics of the substrate. For making carpet, about 10 to about 200, preferably about 30 to about 120 ounces of polyurethane foam are applied per square yard.

As described in U.S. Pat. No. 4,853,054, it is often preferred to use a substantially non-cellular precoat when a textile is the substrate. Suitable precoats include latex precoats or polyurethane precoats as described in U.S. Pat. Nos. 4,296,159 and 4,696,849, incorporated by reference. Precoat weights of about 3 to about 70, preferably about 5 to about 40 ounces per square yard are suitable.

The coated substrate made in accordance with this invention is useful for various purposes, according to the substrate selected, such as carpeting, carpet padding, draperies, tennis balls, artificial playing surfaces, wall coverings, dust abatement coverings, and the like.

ILLUSTRATIVE EMBODIMENTS

The following examples are given to illustrate the invention and should not be interpreted as limiting it in any way. Unless stated otherwise, all parts and percentages are given by weight.

EXAMPLE 1

A B-side formulation is prepared by mixing the components indicated in Table 1.

TABLE 1

| Component | Parts by Weight |
|---|---|
| Polyol A① | 44 |
| Polyol B② | 44 |
| Diethylene Glycol | 12 |
| Alumina Trihydrate | 50 |
| Calcium Carbonate | 60 |
| Organotin Catalyst③ | 0.014 |
| Silicone Surfactant④ | 0.20 |

①A 2000 equivalent weight, 18% ethylene oxidecapped poly(propylene oxide) having an actual functionality of 1.70.
②A 2000 equivalent weight, 18% ethylene oxidecapped poly(propylene oxide) having an actual functionality of 2.30.
③Di(isooctyl)tin bis(isooctylmercaptylacetate).
④Sold as L-5440 by Union Carbide Corporation.

Sample No. 1 is prepared by mixing the components listed in Table 1 with Polyisocyanate A at a 105 index and frothing with air in an Oakes foamer to a froth density of about 420 grams/quart. Polyisocyanate A is a blend containing 50% by weight of a 183 equivalent weight prepolymer prepared by reacting pure 4,4'-MDI with a 2100 equivalent weight, 14% ethylene oxide capped poly(propylene oxide) with an actual functionality of 2.2. The remaining portion of Polyisocyanate A is a polymeric MDI having an average functionality of 2.3 and an o,p'-content of about 12% by weight.

The frothed mixture is then applied to the reverse side of an 18.3 ounce/yard level loop carpet having a nylon fabric tufted through a woven polypropylene primary backing. After application and gauging to about ¼" thickness, the polyurethane layer is cured at 120° C. for 8 minutes. For physical property testing, a portion of the mixture is gauged onto a releasable substrate, cured as above, and removed from the substrate for testing. Results of the physical property testing are as indicated in Table 2 following.

Comparative Sample A is prepared in the same manner as Sample No. 1, except for the polyisocyanate component. In Comparative Sample A, a 50/50 blend of a polymeric MDI having an average functionality of 2.3 and an o,p'-content of 12% by weight with a 181 equivalent weight prepolymer prepared by reacting 4,4'-MDI with a 45/55 mixture of dipropylene glycol and tripropylene glycol is used. Results of physical property testing are as reported in Table 2.

Comparative Samples B-D show how with previously known MDI-based systems, a sacrifice of tensile, load bearing and tear strength is needed to obtain acceptable resiliency. Comparative Sample B is the same as Comparative Sample A, except the calcium carbonate amount is only 47 parts. Comparative Sample C is the same as Comparative Sample B, except the diethylene glycol level is reduced to 7.7 parts and each of Polyol A and Polyol B are increased to 46.15 parts. Comparative Sample D is the same as Comparative Sample B, except the diethylene glycol level is reduced to 6.5 parts and each of Polyol A and Polyol B are increased to 46.75 parts. The results of physical property testing of each are reported in Table 2.

TABLE 2

| Property | Sample or Comparative Sample No. | | | | |
|---|---|---|---|---|---|
| | 1 | A* | B* | C* | D* |
| Density, pcf | 18.6 | 18.0 | 18.0 | 18.6 | 18.0 |
| 50% Compression Set, %① | 4.4 | 2.9 | 2.9 | 2.0 | 4.5 |
| 25% ILD, lb.② | 24.0 | 24.2 | 23.0 | 16.9 | 7.5 |
| Tensile Strength, psi③ | 62.9 | 85.8 | 65.0 | 44.9 | 23.0 |
| Elongation, %③ | 82 | 96 | 96 | 107 | 107 |
| Tear Strength, pli④ | 5.1 | 5.9 | 5.0 | 3.4 | 2.3 |
| Resiliency, %⑤ | 34 | 19 | 19 | 29 | 37 |

①ASTM 3574-81 Test D.
②ASTM 3574-81 Test B.
③ASTM 3574-81 Test E.
④ASTM 3574-81 Test F.
⑤ASTM 3574-81 Test H.

Sample No. 1 is roughly comparable in properties to Comparative Sample A except for a slight decrease in tensile strength and a 50% improvement in resilience. The lower tensile strength is expected, since Comparative Sample No. 1 contains a higher level of chain extender due to the use of chain extenders in the preparation of the prepolymer. Comparative Samples B, C and D show the relationship between strength properties (tensile, ILD, tear) and resiliency. These samples show that modifications which improve resiliency (reducing chain extender level) cause drastic reductions in resiliency to the point that in Comparative Sample B, unacceptable resiliency is obtained. Thus, Comparative Samples A and B, which exhibit acceptable strength properties, obtain such only at the cost of poor resiliency.

What is claimed is:

1. In a process for preparing a polyurethane-backed substrate wherein an uncured polyurethane-forming composition is applied to a surface of the substrate, gauged and cured to form an adherent backing thereto, the improvement comprising employing a polyurethane-forming composition containing
    (A) at least one isocyanate-reactive material having an average equivalent weight of about 1000 to about 5000,
    (B) an effective amount of a blowing agent, and
    (C) a polyisocyanate in an amount to provide an isocyanate index of about 90 to about 130, wherein at least 30% by weight of such polyisocyanate is a soft segment prepolymer which is the reaction product of a stoichiometric excess of diphenylmethane diisocyanate (MDI) or a derivative thereof and an isocyanate-reactive organic polymer having an equivalent weight from about 500 to about 5000, said prepolymer having an NCO content of about 10 to about 30% by weight.

2. The process of claim 1 wherein said soft segment prepolymer is the reaction product of a stoichiometric excess of MDI, polymeric MDI or liquid MDI, and an organic polymer having an equivalent weight from about 1000 to about 3000 and an average functionality from about 1.4 to about 3.0.

3. The process of claim 2 wherein said organic polymer is a hydroxyl-terminated polymer of propylene oxide, or a block or random copolymer of a major portion of propylene oxide and a minor portion of ethylene oxide.

4. The process of claim 3 wherein component (A) is a polymer of propylene oxide or a copolymer of a major portion propylene oxide and a minor portion of ethylene oxide, having a functionality of about 1.8 to about 2.2.

5. The process of claim 3 wherein said polyurethane-forming composition further contains a silicone surfactant and a chain extender.

6. The process of claim 5 wherein the substrate is a textile.

7. The process of claim 6 wherein a release layer is applied to the surface of the polyurethane-forming layer prior to the curing thereof.

* * * * *